(12) United States Patent
Xue et al.

(10) Patent No.: US 9,420,626 B2
(45) Date of Patent: Aug. 16, 2016

(54) METHOD AND DEVICE FOR MANAGING RELEASE OF NETWORK PORT OF MOBILE TERMINAL

(71) Applicant: ZTE Corporation, Shenzhen, Guangdong (CN)

(72) Inventors: Tao Xue, Shenzhen (CN); Xiangyang Yan, Shenzhen (CN); Bin Wang, Shenzhen (CN); Bin Zhao, Shenzhen (CN); Chen Lu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/412,791

(22) PCT Filed: Jul. 10, 2013

(86) PCT No.: PCT/CN2013/079154
§ 371 (c)(1),
(2) Date: Jan. 5, 2015

(87) PCT Pub. No.: WO2013/170816
PCT Pub. Date: Nov. 21, 2013

(65) Prior Publication Data
US 2015/0195868 A1    Jul. 9, 2015

(30) Foreign Application Priority Data

Oct. 8, 2012  (CN) .......................... 2012 1 0377597

(51) Int. Cl.
*H04W 76/06*       (2009.01)
*H04L 12/28*       (2006.01)
(Continued)

(52) U.S. Cl.
CPC ........... *H04W 76/06* (2013.01); *H04L 12/2859* (2013.01); *H04L 43/0811* (2013.01); *H04L 69/168* (2013.01); *H04W 76/027* (2013.01)

(58) Field of Classification Search
None
See application file for complete search history.

(56) References Cited

U.S. PATENT DOCUMENTS 5,661,725 A * 8/1997 Buck ................... H04Q 11/04
                                                        370/377
6,862,276 B1   3/2005 Abrol
(Continued)

FOREIGN PATENT DOCUMENTS

CN       101388884 A     3/2009
CN       101583086 A    11/2009
(Continued)

OTHER PUBLICATIONS

International Search Report in international application No. PCT/CN2013/079154, mailed on Oct. 17, 2013.
(Continued)

*Primary Examiner* — Edan Orgad
*Assistant Examiner* — Rebecca Song
(74) *Attorney, Agent, or Firm* — Oppedahl Patent Law Firm LLC

(57) ABSTRACT

The present disclosure discloses a method for managing release of a network port of a mobile terminal, and the method includes: during a PPPoE dialup or after completion of the PPPoE dialup, network ports of a current mobile terminal are scanned; it is determined whether scanned idle network ports are released erroneously, it is determined whether restoration of connection is desired for an erroneously released network port, and the restoration of connection is implemented according to conditions of current network connection and the PPPoE dialup when the restoration of connection is desired. The present disclosure further discloses a device for managing release of a network port of a mobile terminal. The method and device make it possible to solve a problem that a network port may be released erroneously after a PPPoE connection is established in the prior art.

5 Claims, 4 Drawing Sheets

(51) Int. Cl.
*H04L 12/26* (2006.01)
*H04L 29/06* (2006.01)
*H04W 76/02* (2009.01)

(56) References Cited

U.S. PATENT DOCUMENTS

| | | | |
|---|---|---|---|
| 7,409,451 B1 * | 8/2008 | Meenan | H04L 12/5692 379/100.15 |
| 2002/0042840 A1 * | 4/2002 | Yamada | H04Q 11/0478 709/239 |
| 2004/0003085 A1 | 1/2004 | Joseph | |
| 2004/0221059 A1 | 11/2004 | Bush | |
| 2005/0060557 A1 * | 3/2005 | Lin | H04L 63/1458 713/188 |
| 2009/0204857 A1 | 8/2009 | Yokokura | |
| 2012/0054571 A1 * | 3/2012 | Howard | H04W 4/001 714/748 |

FOREIGN PATENT DOCUMENTS

| | | |
|---|---|---|
| CN | 101764901 A | 6/2010 |
| CN | 101795263 A | 8/2010 |
| CN | 101854429 A | 10/2010 |
| CN | 102364979 A | 2/2012 |
| CN | 102892135 A | 1/2013 |
| EP | 1054547 A2 | 11/2000 |
| EP | 1501240 A2 | 1/2005 |
| EP | 1909464 A2 | 4/2008 |

OTHER PUBLICATIONS

English Translation of the Written Opinion of the International Search Authority in international application No. PCT/CN2013/079154, mailed on Oct. 17, 2013.
Supplementary European Search Report in European application No. 13790705.1, mailed on Aug. 11, 2015.

* cited by examiner

METHOD AND DEVICE FOR MANAGING RELEASE OF NETWORK PORT OF MOBILE TERMINAL

TECHNICAL FIELD

The present disclosure relates to techniques for managing a mobile terminal, and in particular to a method and device for managing release of a network port of a mobile terminal.

BACKGROUND

With the development of communication techniques, users have an increasing demand on bandwidths, and a dialup approach of Local Area Network (LAN) access through the Point-to-Point Protocol over Ethernet (PPPoE) has become a main solution for users in a certain area to access the Internet due to its speedup and upgrade, convenience and stability; in addition, since the PPPoE supports multi-terminal dialup, multifunctional network services that don't share bandwidths such as Internet Protocol Television (IPTV) is provided therefrom.

At present, users have various terminals to surf the Internet, and mobile terminals such as a mobile phone, PDA and the like may also have Internet access functionality. But since mobile terminals have no Ethernet interfaces, they can't access the Internet through a network cable but through wireless routing. However, accessing the Internet through wireless routing has the following problems:

1. low confidentiality: since many terminals can't support dialup Internet access, a wireless router is needed for the terminals to implement a dialup, but there are many WiFi squatting softwares which make WiFi squatting easily occur.

2. Low efficiency: since bandwidths are shared, implementing a dialup through a wireless router may make other terminals connected thereto can't re-dialup any more, thus resulting in a scenario that all the terminals compete for bandwidths.

In order to solve above network access problems of mobile terminals and make sure respective mobile terminals have exclusive bandwidths for accessing the Internet, a solution for a mobile terminal to implement a PPPoE dialup by itself emerges. In the solution for a mobile terminal to implement a PPPoE dialup by itself, its of great importance to release network ports of the mobile terminal, if there is something wrong during release of network ports of the mobile terminal, the stability of the PPPoE dialup by the mobile terminal itself will be severely affected. Such as interruption of a running process during network data download/upload or abnormal exit of an upper layer application and the like, in which a "normal" PPPoE connection is indicated but no network data transmission can be implemented, and root causes for all these problems are abnormality occurred during processing an application resulted form erroneous release of network ports of the mobile terminal after a PPPoE connection is established.

SUMMARY

In view of the above, the present disclosure is intended to provide a method and device for managing a network port of a mobile terminal capable of solving a problem that a network port may be released erroneously after a PPPoE connection is established in the prior art.

To this end, the technical solutions of the present disclosure are implemented as follows.

A method for managing release of a network port of a mobile terminal includes:

during a PPPoE dialup or after completion of the PPPoE dialup, network ports of a current mobile terminal are scanned;

it is determined whether scanned idle network ports are released erroneously, it is determined whether restoration of connection is desired for an erroneously released network port, and the restoration of connection is implemented according to conditions of current network connection and the PPPoE dialup when the restoration of connection is desired.

In an embodiment, the scanning network ports of a current mobile terminal may include: all idle network ports that are not currently occupied by an application are counted and causes of releasing the network ports are recorded.

In an embodiment, the scanning may be an one-time scan, a periodic scan or a scan enabled when an idle rate of network ports is lower than a certain value.

In an embodiment, the determining whether scanned idle network ports are released erroneously may include: it is determined first whether current network ports are never allocated or idle due to being released by an upper layer application and then causes of being idle are determined.

In an embodiment, the determining whether scanned idle network ports are released erroneously may include: if an network port is considered as being already allocated and thus can't be used normally because the network port is correlated with an upper layer application before, the network port is regarded as being released erroneously;

or if an network port is idle due to being released by an upper layer application but a cause of its latest release is Not Normal, the network port is regarded as being released erroneously.

In an embodiment, the determining whether scanned idle network ports are released erroneously may include:

one of released network ports is selected and it is determined whether the selected network port is considered as being already allocated and thus can't be used normally because the network port is correlated with an upper layer application before, if Not, a monitoring timer for data transmission/reception of the network port is set; after the monitoring timer elapses, it is checked whether there is data transmission/reception on the network port during a set period of time, if there is no data transmission/reception, the network port is regarded as not being released erroneously; if there is data transmission/reception, the network port is regarded as being released erroneously.

In an embodiment, the determining whether restoration of connection is desired may include: it is determined whether restoration of connection of an network port is desired to be implemented on an upper layer application corresponding to the erroneously released network port, if it is desired, the restoration of connection of the network port is implemented or a new network port is re-applied for the use of the upper layer application; if it is not desired, end the process.

In an embodiment, the implementing the restoration of connection according to conditions of current network connection and the PPPoE dialup may include: if the current network connection is interrupted, all network ports are released, and the PPPoE dialup is re-performed when the network connection returns to normal; if the current network connection and the PPPoE dialup are normal, PPPoE dialup connection is completed.

A device for managing release of a network port of a mobile terminal includes a scan module, a determination module and a network connection module, wherein the scan module is configured to scan network ports of a current mobile terminal during a PPPoE dialup or after completion of the PPPoE dialup;

the determination module is configured to determine whether scanned idle network ports are released erroneously comprises: and the network connection module is configured to determine whether restoration of connection is desired for an erroneously released network port determined and implement the restoration of connection according to conditions of current network connection and the PPPoE dialup when the restoration of connection is desired.

The determination module further includes an analysis module and a detection module, wherein the analysis module is configured to determine first whether current network ports are never allocated or idle due to being released by an upper layer application and then determine causes of being idle; and the detection module is configured to detect whether there is data transmission/reception on an idle network port that is determined as not being never allocated, regard the network port as being idle if it is monitored that there isn't data transmission/reception on the network port and regard the network as being released erroneously if there is data transmission/reception.

In the method and device for managing release of a network port of a mobile terminal provided by the present disclosure, it is determined whether scanned idle network ports are released erroneously, and re-dialup is implemented on an erroneously released network port by which restoration of connection is desired. In this way, by using convenience and readiness to be reconstructed of functional upgrade of the mobile terminal, the problem that a network port may be released erroneously after a PPPoE connection is established in the prior art can be solved by making appropriate modifications to functionality of the mobile terminal. In addition, the present disclosure can be applicable to various types of terminals, it is only desired to make appropriate modifications to functions of a user terminal so as to meet requirements, thus making the present disclosure implemented readily and conveniently.

DETAILED DESCRIPTION

In embodiments of the present disclosure, during a PPPoE dialup or after completion of the PPPoE dialup, network ports of a current mobile terminal are scanned; when it is determined that the scanned idle network ports are released erroneously, re-dialup and re-connection are implemented on the erroneously released network ports that are desired to be re-connected.

Here the scan can be an one-time scan or a periodic scan. For a network port desired to be re-connected, a re-dialup is all that is required and it is not necessary to prompt a user.

In order to make technical solutions of the present disclosure more clear, the present disclosure will be further elaborated below with reference to the accompanying drawings and embodiments.

Figure 1:
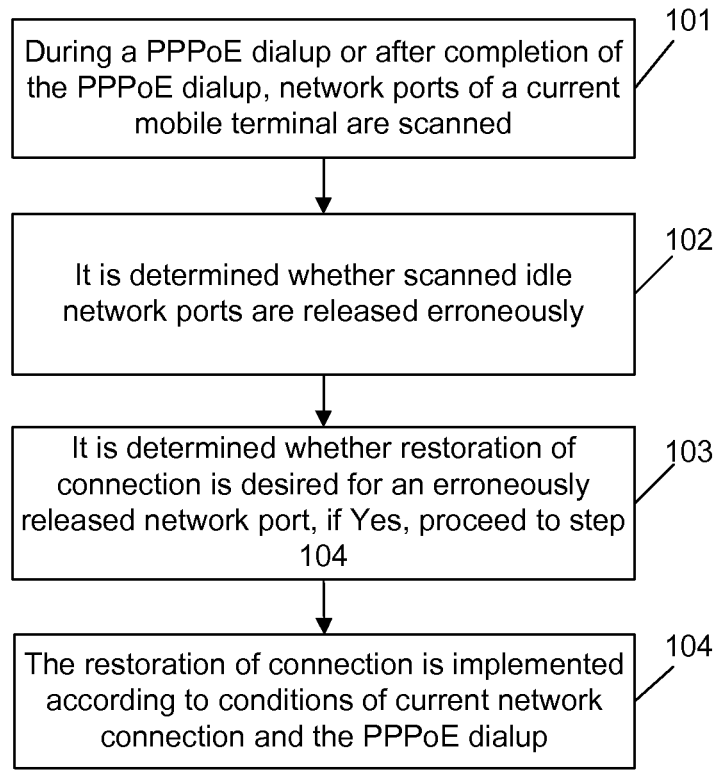
FIG. 1 is a schematic flow chart of a method for managing release of a network port of a mobile terminal according to the present disclosure.

The method for managing release of a network port of a mobile terminal according to embodiments of the present disclosure is as shown in FIG. 1, and the method includes the following steps:

Step 101, during a PPPoE dialup or after completion of the PPPoE dialup, network ports of a current mobile terminal are scanned.

Specifically, the network ports are network ports related to the TCP/IP, and each upper layer application that is related to a network will use a network port for communication.

Here the scan is mainly a scan for logical occupancy and it can be an one-time scan or can also be a periodic scan with a scanning period determined as required or can further be a scan enabled when an idle rate of network ports is lower than a certain value.

Specifically, the scan for logical occupancy refers to counting which network ports are idle namely currently not occupied by an application and recording causes of releasing the network ports, i.e., why idle network ports are in idle state.

Step 102, it is determined whether the scanned idle network ports are released erroneously;

specifically, the release of an network port means that a previously occupied network port is not occupied any longer;

herein the determination is to determine first whether current network ports are never allocated or idle due to being released by an upper layer application and then further determine causes of being idle, to be specific:

For a network port that is never allocated, it needs to determine why it is not allocated, and whether the network port is correlated with an upper layer application before, which makes the network port considered as being already allocated and can't be used normally, if Yes, the network port is erroneously released.

In an embodiment, the allocated network ports may include: a default application network port for example a network port 80 occupied by default by HTTP; network ports allocated by a system, for example network ports 0-1023 defined by Microsoft; then network ports in a scope of 1024-65535 used by other softwares are randomly allocated to certain upper layer application services for example network port 1024 is allocated to an application which applies firstly to the system for a network port.

For a network port that is idle due to being released by an upper layer application, it is desired to determine causes why the released network port is latest released according to the recorded causes of being released, i.e., whether the network port is released normally, if it is not released normally, the network port is released erroneously.

Herein there are many causes why network ports are released, for example, poweroff of a mobile terminal belongs to normal release of network ports; there are also many kinds of erroneous release, for example, if an Instant Messaging (IM) tool application is closed but network ports occupied by the application are not yet released, it may result in problems that the network ports can't be connected to and thus data upload/download can't be implemented when other network communication tools are used.

Herein the determination of whether current network ports are never allocated or idle due to being released by an upper layer application will be recorded automatically by a user terminal.

Step 103, it is determined whether restoration of connection is desired for an erroneously released network port, if the restoration of connection is desired, proceed to step 104; otherwise, end the current process;

specifically, the determining whether restoration of connection is desired may include: it is determined whether restoration of connection of an network port is desired to be implemented on an upper layer application corresponding to the erroneously released network port, i.e., whether the corresponding upper layer application still needs to be connected to a network, for example, an error code 678 (no response) indicates that restoration of connection is desired to be implemented on the network port; if it is desired, the restoration of connection of the network port is implemented or a new network port is re-applied for the use of the upper layer application.

If restoration of connection of an network port is not desired to be implemented on the upper layer application corresponding to the erroneously released network port, for example if a prompt of an incorrect user name or password is got, the restoration of connection of the network port is not desired to be implemented, and then the current process is ended.

Figure 2:
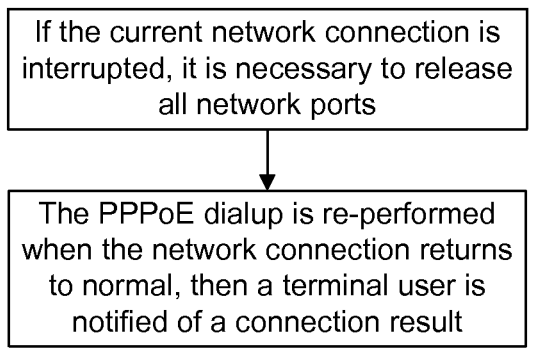
FIG. 2 is a schematic flow chart of exception handling in the present disclosure.

Step 104, the restoration of connection is implemented according to conditions of current network connection and the PPPoE dialup;

Specifically, if the current network connection is interrupted, all network ports are desired to be released, and the PPPoE dialup is re-performed when the network connection returns to normal, then a terminal user is notified of a connection result; if the current network connection and the PPPoE dialup are normal, PPPoE dialup connection is directly completed, as shown in FIG. 2.

Figure 3:
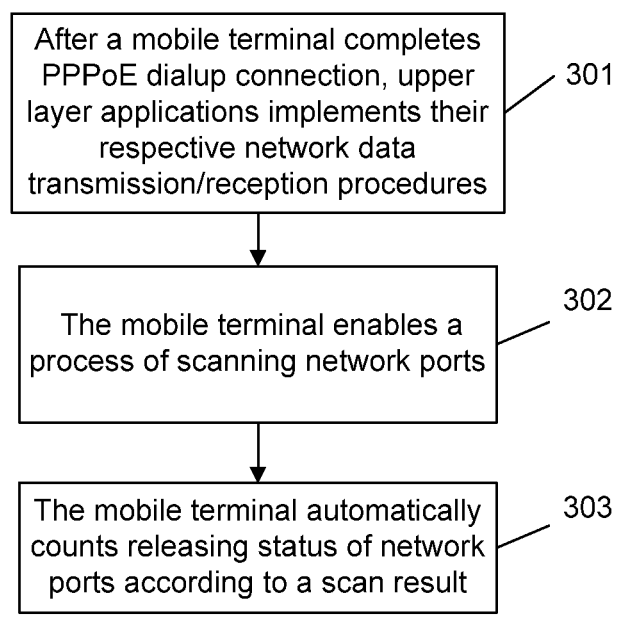
FIG. 3 is a schematic flow chart of a process for scanning a network port of a mobile terminal according to the present disclosure.

FIG. 3 is a schematic flow chart of a process for scanning a network port of a mobile terminal according to embodiments of the present disclosure, as shown in FIG. 3, the process includes the following steps:

Step 301, after a mobile terminal completes PPPoE dialup connection, upper layer applications implements their respective network data transmission/reception processes;

herein the network data transmission/reception processes are related to the upper layer applications, for example, communications performed by an IM tool, transmission/reception of mails by using a mailbox.

Step 302, the mobile terminal enables a process of scanning network ports;

herein the process of scanning network ports can be an one-time scan or a periodic scan, and it may also be a scan enabled when an idle rate of network ports is lower than a certain value such as a certain percentage.

Step 303, the mobile terminal automatically counts releasing status of network ports according to a scan result;

further, the mobile terminal will count which network ports are released currently (namely idle) and which upper layer applications the idle network ports is correlated with.

Herein the correlation between a network port and an upper layer application means that the upper layer application used the network port, for example, an IM tool used network port 20000.

Figure 4:
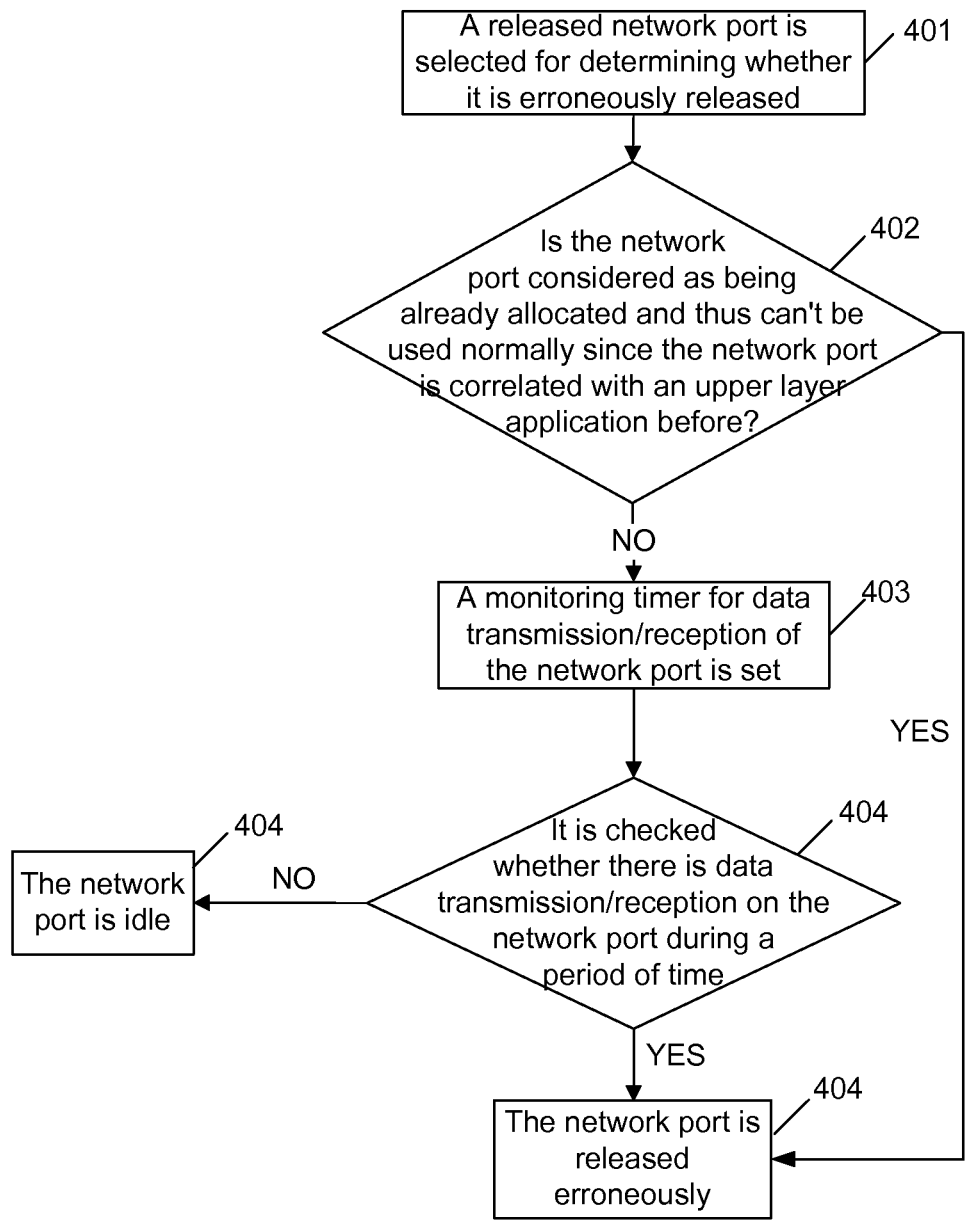
FIG. 4 is a schematic flow chart of a process for determining erroneous release of a network port of a mobile terminal according to the present disclosure.

FIG. 4 is a schematic flow chart of a process for determining erroneous release of a network port of a mobile terminal according to embodiments of the present disclosure, as shown in FIG. 4, the process includes the following steps:

Step 401, one erroneously released network port is selected for performing determination of erroneous release;

herein the selection refers to selecting a released network port from the counting result at step 303.

Step 402, it is determined whether a selected network ports is never allocated and corresponding causes.

Herein the determining causes why the network port is never allocated includes: if the network port is considered as being already allocated and thus can't be used normally because the network port is correlated with an upper layer application before, it indicates that the network port is erroneously released, and then end the current process; otherwise, proceed to step 403.

Step 403, a monitoring timer for data transmission/reception of the network port is set;

herein the monitoring time of the timer can be set in a unified way, i.e., setting a specific time value such as 5 minutes; and it can also be set independently according to the type of an application with which the network port correlates so as to monitor data transmission/reception of the network port, for example, if a network port correlates with an IM application, the monitoring time of the timer can be longer; for another example, if a network port correlates with an application of video playing type or an application of download type, the monitoring time of the timer can be shorter.

Step 404, after the monitoring timer elapses, it is checked whether there is data transmission/reception on the network port during a set period of time, if there is no data transmission/reception, it means that the network port is idle, i.e., not being released erroneously; if there is data transmission/reception, it means that the network port may be released erroneously.

For erroneously released network ports it will be determined further whether restoration of connection is desired, i.e., implementing processes of step 103 and step 104.

By taking a smart phone having network access as an example, the method for managing release of a network terminal of a mobile phone provided by embodiments of the present disclosure is explained. When a dialup is performed through a wireless router by using a smart phone's PPPoE dialup functionality, if a user is prompted of an account or password error when he/she tries to login in, then it belongs to normal release of network ports and there is no need to re-connect the network port; but if an IM application has no responses, it means that an anomaly occurs in the upper layer application, i.e., erroneous release of a network port occurs, accordingly, the network port is desired to be re-connected, if connection is tried, but the upper layer application still can't be used, reconnection to a network by using a PPPoE dialup needs to be tried, and then the user is notified of a connection result.

Figure 5:
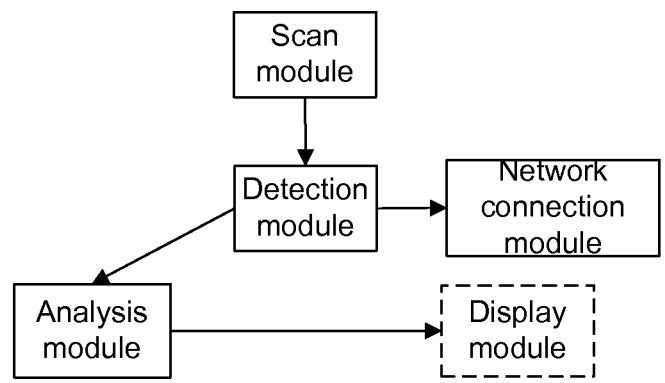
FIG. 5 is a schematic structural diagram of a device for managing release of a network port of a mobile terminal according to the present disclosure.

Based on above method, embodiments of the present disclosure further provide a device for managing release of a network port of a mobile terminal including a scan module, a determination module and a network connection module as shown in FIG. 5, wherein the scan module is configured to scan network ports of a current mobile terminal during a PPPoE dialup or after completion of the PPPoE dialup;

herein the scan module is specifically configured to scan occupancy status of network terminals, i.e., count which network ports are idle namely currently not occupied by an application, and record causes of releasing the network ports.

The determination module is configured to determine whether scanned idle network ports are released erroneously;

herein the determination module further includes an analysis module and a detection module, wherein the analysis module is configured to determine first whether current network ports are never allocated or idle due to being released by an upper layer application and then determine causes of being idle; and the detection module is configured to detect whether there is data transmission/reception on an idle network port that is determined as not being never allocated; if there is no data transmission/reception, it means that the network port is idle; if there is data transmission/reception, it means that the network port may be released erroneously.

The network connection module is configured to determine whether restoration of connection is desired for an erroneously released network port and implement the restoration of connection according to conditions of current network connection and the PPPoE dialup when the restoration of connection is desired;

specifically, it is determined whether restoration of connection of an network port is desired to be implemented on an upper layer application corresponding to the erroneously released network port, if it is desired, the restoration of connection of the network port is implemented or a new network port is re-applied for the use of the upper layer application; if it is not desired, there is no need to perform restoration of connection on the network port.

If the current network connection is interrupted, all network ports are desired to be released, and the PPPoE dialup is re-performed when the network connection returns to normal, then a terminal user is notified of a connection result; if the current network connection and the PPPoE dialup are normal, PPPoE dialup connection is directly completed.

The device may also include a display module configured to prompt a user whether restoration of network connection is desired by an application.

In embodiments of the present disclosure, the mobile terminal can be a portable mobile terminal without a wired network port that has functionality of PPPoE dialup for accessing the Internet through wireless routing, such as a smart phone, PDA and the like.

Embodiments of the present disclosure can be widely applied to various terminal equipments such as a mobile phone, a desktop phone and the like; furthermore, they can be not only used in a document reading process but also applicable to control of various page displays.

What described are merely preferable embodiments of the present disclosure, and are not intended to limit the present disclosure.

INDUSTRIAL APPLICABILITY

Embodiments of the present disclosure provide a method for managing release of a network port of a mobile terminal, and the method includes: during a PPPoE dialup or after completion of the PPPoE dialup, network ports of a current mobile terminal are scanned; it is determined whether scanned idle network ports are released erroneously, it is determined whether restoration of connection is desired for an erroneously released network port, and the restoration of connection is implemented according to conditions of current network connection and the PPPoE dialup when the restoration of connection is desired. Embodiments of the present disclosure further disclose a device for managing release of a network port of a mobile terminal. The method and device provided by embodiments of the present disclosure make it possible to solve a problem that a network port may be released erroneously after a PPPoE connection is established in the prior art.

The invention claimed is:

1. A method for managing release of a network port of a mobile terminal, the method comprising:

during a Point-to-Point Protocol over Ethernet, PPPoE, dialup or after completion of the PPPoE dialup, scanning network ports of a current mobile terminal;

determining whether scanned idle network ports are released erroneously, determining whether restoration of connection is desired for an erroneously released network port, and implementing the restoration of connection according to conditions of current network connection and the PPPoE dialup when the restoration of connection is desired;

wherein the step of determining whether the scanned idle network ports are released erroneously comprises:

determining first whether current network ports are never allocated or idle due to being released by an upper layer application and then determining causes of being idle; if an network port is considered as being already allocated and thus can't be used normally because the network port is correlated with an upper layer application before, regarding the network port as being released erroneously; or if an network port is idle due to being released by an upper layer application but a cause of its latest release is Not Normal, regarding the network port as being released erroneously; or selecting one of the released network ports and determining whether the selected network port is considered as being already allocated and thus can't be used normally because the network port is correlated with an upper layer application before, if Not, setting a monitoring timer for data transmission/reception of the network port; after the monitoring timer elapses, checking whether there is data transmission/reception on the network port during a set period of time, if there is no data transmission/reception, regarding the network port as not being released erroneously; if there is data transmission/reception, regarding the network port as being released erroneously.

2. The method according to claim 1, wherein the step of scanning network ports of a current mobile terminal comprises: counting all idle network ports that are not currently occupied by an application and recording causes of releasing the network ports.

3. The method according to claim 1, wherein the step of scanning is an one-time scan, a periodic scan or a scan enabled when an idle rate of network ports is lower than a certain value.

4. The method according to claim 1, wherein the step of determining whether restoration of connection is desired comprises: determining whether restoration of connection of an network port is desired to be implemented on an upper layer application corresponding to the erroneously released network port, if it is desired, implementing the restoration of connection of the network port or re-applying a new network port for the use of the upper layer application; if it is not desired, end the process.

5. The method according to claim 1, wherein the step of implementing the restoration of connection according to conditions of current network connection and the PPPoE dialup comprises: if the current network connection is interrupted, releasing all network ports, and re-performing the PPPoE dialup when the network connection returns to normal; if the current network connection and the PPPoE dialup are normal, completing PPPoE dialup connection.

* * * * *